US008954196B2

(12) United States Patent
Gross

(10) Patent No.: US 8,954,196 B2
(45) Date of Patent: Feb. 10, 2015

(54) REACTOR TEMPERATURE CONTROL USING PROBABILITY DISTRIBUTION

(75) Inventor: Michael J. Gross, Cantonment, FL (US)

(73) Assignee: Huntsman Petrochemical LLC, The Woodlands, TX (US)

(*) Notice: Subject to any disclaimer, the term of this patent is extended or adjusted under 35 U.S.C. 154(b) by 662 days.

(21) Appl. No.: 13/119,337

(22) PCT Filed: Sep. 18, 2009

(86) PCT No.: PCT/US2009/057422
§ 371 (c)(1),
(2), (4) Date: Mar. 16, 2011

(87) PCT Pub. No.: WO2010/036568
PCT Pub. Date: Apr. 1, 2010

(65) Prior Publication Data
US 2011/0166367 A1     Jul. 7, 2011

Related U.S. Application Data

(60) Provisional application No. 61/099,726, filed on Sep. 24, 2008.

(51) Int. Cl.
*C07D 307/89* (2006.01)
*B01J 8/06* (2006.01)
*G05D 23/19* (2006.01)

(52) U.S. Cl.
CPC .............. *B01J 8/067* (2013.01); *G05D 23/1919* (2013.01); *B01J 2208/00061* (2013.01); *B01J 2208/00212* (2013.01); *B01J 2219/002* (2013.01); *B01J 2219/00204* (2013.01); *B01J 2219/0022* (2013.01); *B01J 2219/0024* (2013.01); *G01K 2213/00* (2013.01)
USPC ........... 700/268; 700/266; 700/270; 700/271; 700/272; 422/105; 436/55

(58) Field of Classification Search
USPC .................. 700/266, 268, 270–272; 422/105; 436/55
See application file for complete search history.

(56) References Cited

U.S. PATENT DOCUMENTS

| 3,518,284 | A |   | 6/1970 | Foster |
| 5,789,331 | A | * | 8/1998 | Tsunoda et al. ............... 502/71 |
| 5,877,368 | A | * | 3/1999 | Kiyama et al. ............... 585/418 |
| 6,046,343 | A |   | 4/2000 | Mummey et al. |

(Continued)

FOREIGN PATENT DOCUMENTS

WO     2006/104787     10/2006

*Primary Examiner* — Shogo Sasaki
(74) *Attorney, Agent, or Firm* — Huntsman International LLC

(57) ABSTRACT

Embodiments of the present invention generally relate to temperature control of a reactor using probability distribution of temperature measurements. In one embodiment, a method of controlling a temperature of a chemical reaction includes injecting a reactant stream into a reactor and through a catalyst bed of the reactor. The reactant stream includes a hydrocarbon and oxygen. Injection of the reactant stream into the catalyst bed causes an exothermic chemical reaction. The method further includes circulating a coolant through the reactor, thereby removing heat from the catalyst bed. The method further includes measuring temperature at a plurality of locations in the catalyst bed. The method further includes calculating a fraction of the catalyst bed greater than a predetermined maximum temperature limit using a probability distribution generated using the temperature measurements.

8 Claims, 3 Drawing Sheets

(56) References Cited

U.S. PATENT DOCUMENTS

| | | |
|---|---|---|
| 6,300,505 B1 | 10/2001 | Burnett et al. |
| 7,964,176 B2 | 6/2011 | Krause et al. |
| 2005/0115307 A1 | 6/2005 | Ristea et al. |
| 2006/0142619 A1 | 6/2006 | Conca et al. |
| 2008/0097637 A1 | 4/2008 | Nguyen et al. |

* cited by examiner

REACTOR TEMPERATURE CONTROL USING PROBABILITY DISTRIBUTION

CROSS-REFERENCE TO RELATED APPLICATIONS

This application is the National Phase of International Application PCT/US2009/057422 filed Sep. 18, 2009 which designated the U.S. and which claims priority to U.S. Provisional App. Ser. No. 61/099,726 filed Sep. 24, 2008. The noted applications are incorporated herein by reference. U.S. Pat. Nos. 6,046,343 and 6,300,505 are hereby incorporated by reference in their entireties.

BACKGROUND OF THE INVENTION

1. Field of the Invention

Embodiments of the present invention generally relate to temperature control of a reactor using probability distribution of temperature measurements.

2. Description of the Related Art

Maleic anhydride is of significant commercial interest throughout the world. It is used alone or in combination with other acids in the manufacture of alkyd and polyester resins. It is also a versatile intermediate for chemical synthesis.

Maleic anhydride is conventionally manufactured by passing a gas comprising a hydrocarbon having at least four carbon atoms in a straight chain and oxygen through a catalyst bed, typically a fixed catalyst bed tubular plug flow reactor, containing a catalyst including mixed oxides of vanadium and phosphorus. The catalyst employed may further comprise promoters, activators or modifiers such as iron, lithium, zinc, molybdenum, chromium, uranium, tungsten, and other metals, boron and/or silicon. The product gas exiting the reactor typically contains maleic anhydride together with oxidation by-products such as carbon monoxide, carbon dioxide, water vapor, acrylic and acetic acids and other by-products, along with inert gases present in air when air is used as the source of molecular oxygen.

Because the reaction is highly exothermic, the reactor must be cooled during operation. Typically, a shell and tube heat exchanger is used as a reactor with the catalyst packed in the tubes through which the hydrocarbon and oxygen gases are passed. A cooling fluid, often a molten salt, flows over and cools the outside of the tubes. Because the length of the tubes is generally much greater than the diameter of the tubes, the reaction system approaches plug flow.

While the cooling capacity is substantially uniform throughout the reactor, the rate of reaction varies widely with the concentration of the hydrocarbon reactant and the temperature of the reaction zone. Because the reactant gases are generally at a relatively low temperature when they are introduced into the catalyst bed, the reaction rate is low in the region immediately adjacent the inlet of the reactor. Once the reaction begins, however, it proceeds rapidly with the rate of reaction further increasing as the reaction zone temperature increases from the heat released by the reaction. The reaction zone temperature continues to increase with distance along the length of the reactor tube until the depletion of the hydrocarbon causes the rate of reaction to decrease thereby decreasing the temperature of the reaction zone through transfer of heat to the cooling fluid, and allowing the remaining portion of the reactor tube to operate at a lower temperature differential. In practice, commercial reactors are configured so that a number of tubes, typically 50-100+, are equipped with a longitudinal thermocouple in the center of the tube, inserted to a tube depth (distance from the top or bottom tubesheet) where maximum temperatures are expected. Of these multiple measurement locations, the location with the highest temperature is generally referred to as the "hot spot".

If the temperature distribution in the reactor increases, reactor performance, catalyst activity, and the integrity of the reactor vessel may deteriorate. Generally, the selectivity of the catalyst varies inversely with the reaction temperature while the rate of reaction varies directly with the reaction temperature. Higher reaction zone temperatures result in lower catalyst selectivity and favor the complete oxidation of the hydrocarbon feedstock to carbon dioxide and water instead of maleic anhydride. As the temperature distribution in the reactor increases, the amount of the hydrocarbon feedstock consumed by the reaction increases but the decreased selectivity of the catalyst can result in a decreased yield of maleic anhydride. In addition, exposure of the catalyst bed to excessive temperatures may degrade the catalyst activity and cause and excessive rate of corrosion of the reactor tubes. Such degradation of the catalyst activity generally reduces the productivity of the operation and may also reduce the selectivity of the catalyst at a given temperature. The higher heat of reaction released by the conversion of the hydrocarbon feedstock to carbon dioxide and water further compounds this problem. An excessive rate of corrosion of the reactor tubes will lead to premature failure of individual tubes or of the entire reactor.

Typically, the catalyst bed temperature is continuously monitored at 50-100+ tubes via a single thermocouple at each location. The bulk of the catalyst bed is maintained below an upper temperature limit by reducing the feed rate of the limiting reactant (i.e., air or butane) if the "hot spot" is above the specified upper temperature limit.

SUMMARY OF THE INVENTION

Embodiments of the present invention generally relate to temperature control of a reactor using probability distribution of temperature measurements. In one embodiment, a method of controlling a temperature of a chemical reaction includes injecting a reactant stream into a reactor and through a catalyst bed of the reactor. The reactant stream includes a hydrocarbon and oxygen. Injection of the reactant stream into the catalyst bed causes an exothermic chemical reaction. The method further includes circulating a coolant through the reactor, thereby removing heat from the catalyst bed. The method further includes measuring temperature at a plurality of locations in the catalyst bed. The method further includes calculating a fraction of the catalyst bed greater than a predetermined maximum temperature limit using a probability distribution generated using the temperature measurements.

In another embodiment, a chemical reactor includes a tubular shell having an inlet and an outlet, each formed through a wall thereof. The reactor further includes three or more tubes disposed in the shell, made from a thermally conductive material, and containing catalyst. The reactor further includes first and second tube sheets, each tube sheet fixed to each of the tubes and coupled to the shell, thereby isolating bores of the tubes from a chamber of the reactor. The reactor further includes first and second heads coupled to the shell, each head having an inlet and an outlet formed through a wall thereof. The reactor further includes two or more temperature sensors, each temperature sensor disposed through the shell, into the bores of respective tubes, and in communication with the catalyst. The reactor further includes a controller in communication with the temperature sensors and configured to perform an operation. The operation includes inputting temperature measurements from the temperature sensors, and calculating a fraction of the catalyst greater than a predetermined maximum temperature limit using a probability distribution generated using the temperature measurements.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
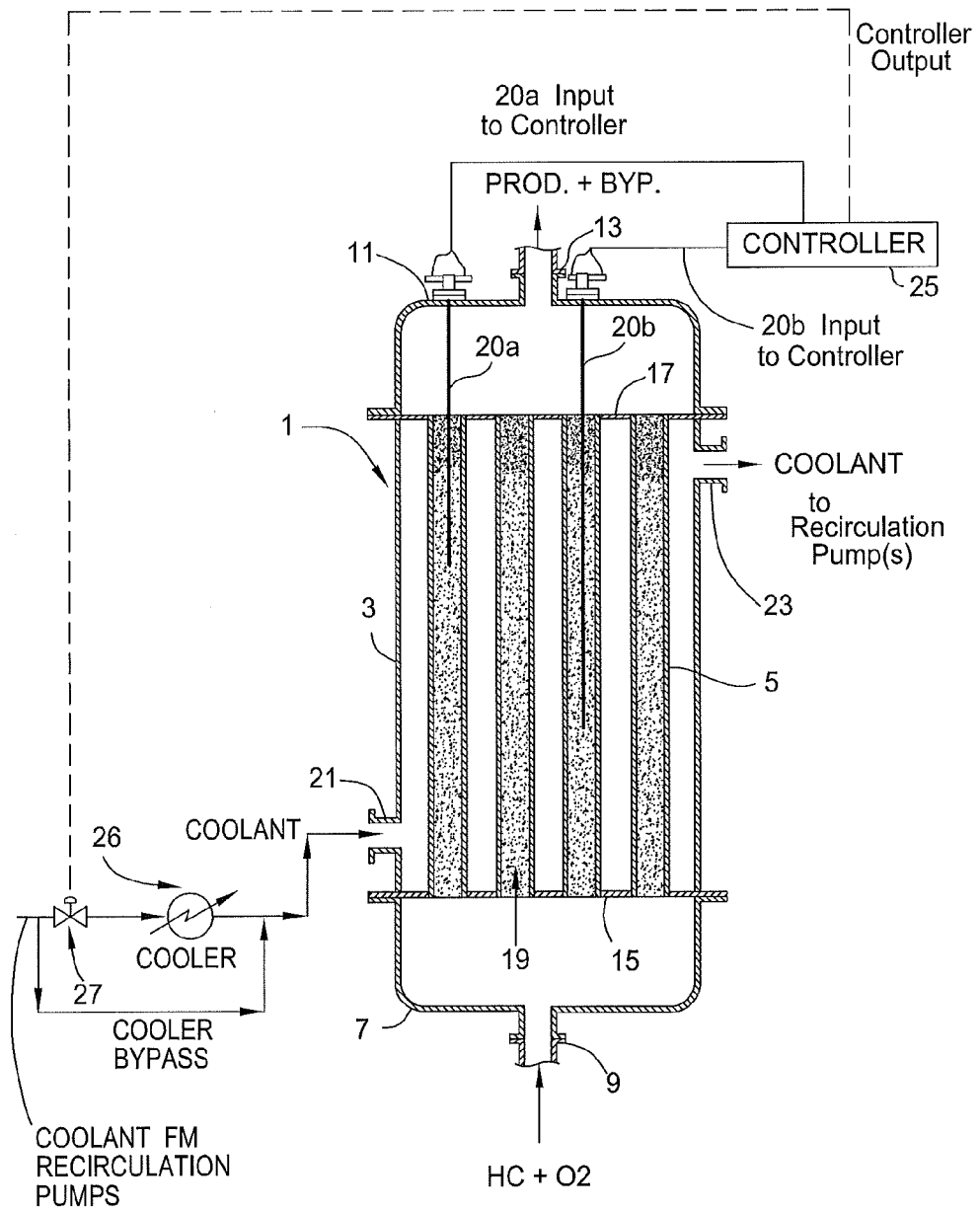
FIG. 1 is a cross-section of a reactor, according to one embodiment of the present invention.

FIG. 1 is a cross-section of a reactor 1, according to one embodiment of the present invention. The reactor 1 may include a tubular shell 3, vertically oriented tubes 5, a lower head 7 having a gas inlet 9, and an upper head 11 having a gas outlet 13. Tubes 5 of the reactor 1 may be fixed in lower 15 and upper 17 tube sheets and may be made from a thermally conductive material so that the reactor functions as a shell and tube heat exchanger. The tubes 5 may be packed with catalyst 19 only or catalyst with a temperature sensor 20. The catalyst 19 may be solid particles, such as beads or pellets, and may be made from a material selected to facilitate a chemical reaction, such as vanadium-phosphorous-oxide (VPO). The columns of catalyst may be collectively referred to as a catalyst bed of the reactor 1. A gas reactant stream $HC+O_2$ may be injected into the reactor 1 via the inlet 9. The reactant stream $HC+O_2$ may include a first reactant, such as hydrogen or a hydrocarbon, such as a hydrocarbon having at least four carbon atoms in a straight chain, such as n-butane or benzene, and a second reactant, such as a gas having a substantial oxygen concentration, such as air.

As the reactant stream flows through the catalyst bed, an exothermic reaction may occur, thereby producing a gas product stream. The product stream may include a desired product, such as maleic anhydride and byproducts, such as inert gases, water, acetic acid, acrylic acid, carbon monoxide and carbon dioxide. The product stream may exit the reactor via the outlet 13 and may be further processed to separate the desired product from the byproducts. Alternatively, the reactant/product stream flow may be reversed. Alternatively, the desired product may be phthalic anhydride (PA), acrolein, methyl mercaptan, acrylic acid, butanediol, methanol, ethylene oxide, ethylene glycol, formaldehyde, hydrogenated vegetable oil or fat, or vinyl chloride monomer.

To remove heat energy from the exothermic reaction, a coolant may be injected into an inlet 21 formed through the shell. The coolant may circulate along outer surfaces of the tubes 5, thereby removing heat energy. The coolant may discharge from the reactor at an outlet 23 where it may be cooled in an external heat exchanger 26 which is equipped with a flow control valve 27, and recirculated via an external pump. Alternatively, coolant flow may be reversed. The coolant may be a liquid, such as molten salt or molten inorganic salt. The average or inlet temperature of the coolant may be controlled at a predetermined set temperature to maintain a stable average catalyst bed temperature.

To monitor the catalyst bed temperature, a plurality of temperature sensors 20a, b may be disposed through respective openings formed in one of the heads 7, 11. The temperature sensors 20a, b may be thermocouples, resistance temperature detectors (RTDs), thermistors, or optical fibers. The temperature sensors 20a, b may extend into respective selective tubes 5 to sense temperatures in the tubes at various longitudinal heights. The temperature sensors may also be radially and tangentially dispersed throughout the reactor 1. Commercial reactors may be sizable and have a multitude of tubes 5, such as one thousand, ten thousand, twenty thousand, thirty thousand, or more tubes. To remain economically feasible, a number of temperature sensors that is a ratio to the number of tubes may be deployed, such as one temperature sensor for every one hundred, two hundred, three hundred, four hundred, or five hundred tubes. A single temperature sensor may contain several elements, such that more than one depth can be monitored within a single tube. The temperature sensors may be asymmetrically concentrated at various longitudinal heights. For example, in a maleic anhydride reactor, a majority of the reaction may occur at lower heights in the reactor and a correspondingly greater concentration of temperature sensors may extend to these heights.

Each of the temperature sensors 20a, b may be in electrical or optical communication with a controller 25. The controller 25 may be a microprocessor based computer and may be located in a control room (not shown). The controller may include a video screen for displaying temperature measurements to a human operator.

As discussed above, the prior art control scheme dictates remedial action if any one of the thermocouples, such as the "hot spot", detects a temperature exceeding a predetermined maximum temperature limit. Due to the high variability associated with the "hot spot" temperature, there are times when reactant feed rate (and production) is curtailed when there has been no actual shift in the bed temperature distribution. Conversely, there are other times when the bed temperature distribution has shifted, causing a higher fraction of the bed to be above the maximum limit, and the maximum temperature does not detect this shift. The maximum bed temperature is a fairly unreliable indication of the true bed temperature distribution and the true fraction of the bed above a specified upper limit.

To overcome these shortcomings, the controller 25 may analyze the temperature measurements ($T_c$) from the temperature sensors 20a, b, using a probability distribution as opposed to simply determining the maximum, thereby more accurately estimating a temperature profile of the catalyst bed. The probability distribution may be based on the theory that differences ($\Delta T$) between each of the catalyst bed temperatures in the reaction zone ($T_c$) and the catalyst bed temperature ($\theta$) adjacent the inlet may be distributed lognormally. This theory has been verified by statistical analysis of a maleic anhydride reactor. An additional temperature sensor may be used to obtain the catalyst bed temperature ($\theta$) adjacent the inlet or the control temperature of the coolant may be used as a convenient approximation thereof. Let $N(T_c > T_{mx})$ represent the number of thermocouples which exceed the maximum temperature limit ($T_{mx}$) and $N(T_c)$ represent the total number of thermocouples. The controller may calculate a fraction $$\left(F(\text{Bed} > T_{mx}) = \frac{N(T_C > T_{mx})}{N(T_C)}\right)$$

of the reactor bed greater than a maximum temperature limit ($T_{mx}$) using the lognormal probability distribution (LNPDF) of the temperature differences ($\Delta T$). The calculated fraction of the reactor bed may then be compared to a predetermined maximum fraction to more accurately assess whether the reactor is operating within acceptable limits. If not, then the remedial action may be taken.

For example, the controller may be programmed to perform an operation. The operation may include inputting temperature measurements ($T_c$) from each temperature sensor 20a, b within the catalyst bed. The operation may further include subtracting the coolant control temperature (as an approximation of θ) from each temperature measurement ($T_c$) to obtain a temperature difference ($\Delta T = T_c - \theta$) and from the maximum temperature limit ($T_{mx}$) to obtain a maximum temperature limit difference ($\Delta T_{mx} = T_{mx} - \theta$). The operation may further include calculating the natural logarithm of each temperature difference (ln($\Delta T$)). The operation may further include calculating the average ($\mu(\ln(\Delta T))$) and standard deviation ($\sigma(\ln(\Delta T))$) of the natural logarithm of each temperature difference (ln($\Delta T$)). The operation may further include generating a lognormal probability density function (LNPDF) using the calculated average and standard deviation of the natural logarithm of each temperature difference. The operation may further include estimating an integral (i.e., using an iterative numerical approximation) of the lognormal probability density function. The integral may be integrated from a first limit, such as the maximum temperature limit difference, to a second limit, such as infinity, to obtain the fraction of the catalyst best greater than the maximum temperature limit:

$$F(\text{Bed} > T_{mx}) =$$
$$\int_{\Delta T_{mx}}^{\infty} LNPDF(\Delta T, \mu, \sigma) d\Delta t = \int_{\Delta T_{mx}}^{\infty} \frac{1}{\sigma\sqrt{2\pi}} e^{\frac{-(\ln(\Delta T)-\mu)^2}{2\sigma^2}} d\Delta t$$

The controller may then compare the fraction of the bed which exceeds the specified temperature maximum to a predetermined maximum fraction. If the calculated fraction is greater than the maximum fraction, the controller may automatically take remedial action, such as reducing the flow rate of the reactant stream. Alternatively, the controller may take remedial action if the calculated fraction is proximate to or equal to the maximum fraction. Alternatively, the controller may provide indication, such as an audio and/or visual alarm, to a human operator who may then take remedial action. If the calculated fraction is less than the maximum fraction, then the process may continue unabated or the reactant stream flow rate may even be increased, especially if the calculated fraction is substantially less than the maximum fraction. The controller may repeat the operation every interval of time, such as every five seconds, one second, one-half second, one-tenth second, one-hundredth or one-thousandth second. Alternatively, the PDF may be a logarithm of any base greater than zero and not one, such as ten.

The maximum temperature limit may depend on the specific reactants and/or catalyst used in the reactor. For example, a maximum temperature limit for a maleic anhydride reactor may be from about 300 to about 550 degrees Celsius or to about 500 degrees Celsius. The maximum fraction may also depend on the specific reactants, catalyst used in the reactor, and/or the age of the catalyst. For example, in a maleic anhydride reactor using a catalyst having a lifespan of three to four years, the maximum fraction of the catalyst bed which is at or above the maximum temperature limit may range from zero to three percent during a first half of the lifespan and then be increased to three to four percent for a second half of the lifespan.

Figure 2:
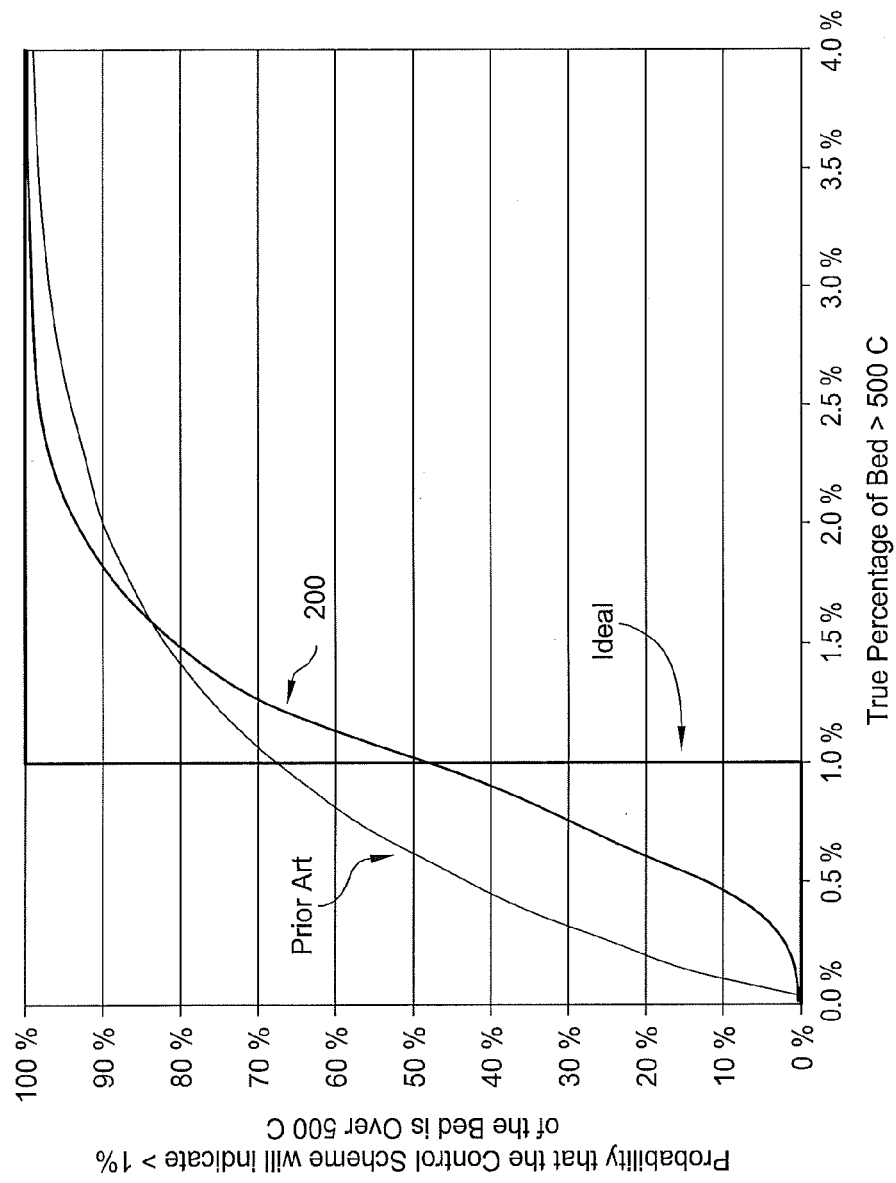
FIG. 2 illustrates a comparison between three temperature control schemes: the Prior Art hot spot scheme, an Ideal scheme, and a scheme according to an embodiment of the present invention.

FIG. 2 illustrates a comparison between three temperature control schemes: the Prior Art hot spot scheme, an Ideal scheme, and a scheme 200 according to an embodiment of the present invention. These curves were created by a Monte Carlo simulation of a maleic anhydride reactor having 31,000 to 35,000 tubes and 108 thermocouples in the catalyst bed and having a maximum temperature limit of 500 degrees Celsius and a maximum fraction of one percent.

In the Ideal control scheme, there is no inaccuracy, such that when the true percentage of the bed greater than 500 degrees Celsius is less than one percent, the control scheme detects the acceptable condition with absolute certainty. Conversely, when the true percentage of the bed greater than 500 degrees Celsius is greater than one percent, the Ideal control scheme detects the unacceptable condition with absolute certainty. Thus the Ideal Control scheme is a step function.

Referring now to the Prior Art scheme and the Embodiment 200, the Embodiment 200 is generally closer to the Ideal scheme than the Prior Art scheme. For example, when the true percentage of the bed greater than 500 degrees Celsius is one-half percent, the probability that the Prior Art scheme will falsely indicate that the maximum fraction has been exceeded is about 45%, as compared to 10% for the Embodiment 200. The exception in the one to one and one-half percent range where the Prior Art scheme enjoys an advantage in accuracy as compared to the Embodiment 200 is not significant due to generosity in safety factors. The Embodiment 200 significantly reduces risk of production and sales loss which occurs when the true fraction of the bed is less than the maximum fraction but the Prior Art scheme falsely indicates otherwise. Conversely, the Embodiment 200 provides greater protection against unknowingly operating the reactor with an excessive fraction of the bed above the upper temperature limit. FIG. 2 assumes 108 thermocouples are present. As the number of thermocouples increases, the Embodiment 200 will be closer to the Ideal scheme.

Figure 3:
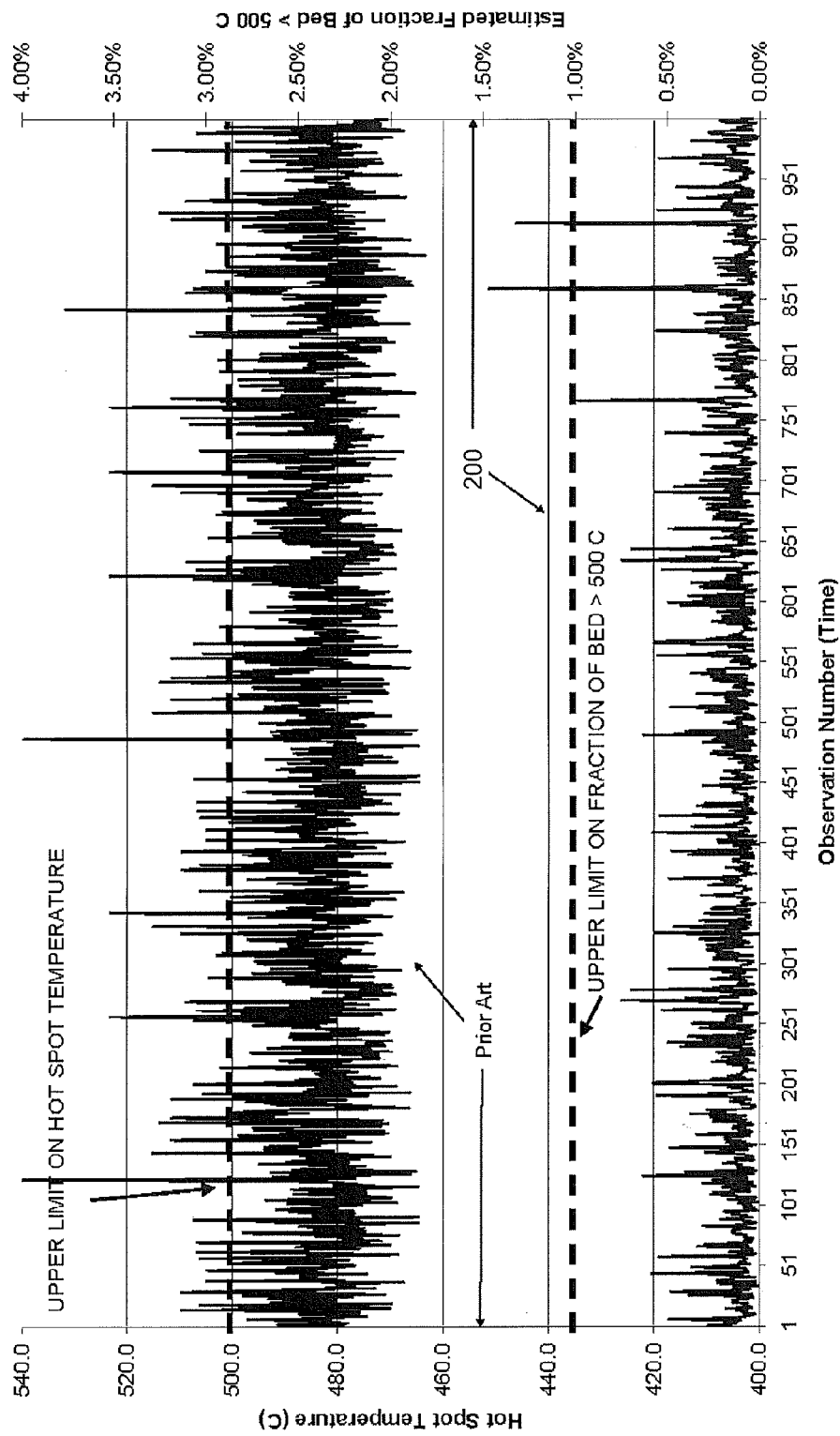
FIG. 3 illustrates another comparison between the Prior Art hot spot scheme and a scheme according to an embodiment of the present invention.

FIG. 3 illustrates another comparison between the Prior Art hot spot scheme and a scheme 200 according to an embodiment of the present invention. As with FIG. 2, these curves were created by a Monte Carlo simulation of a maleic anhydride reactor having 31,000 to 35,000 tubes and 108 thermocouples in the catalyst bed and having a maximum temperature limit of 500 degrees Celsius and a maximum fraction of one percent. The actual fraction of the catalyst bed at a temperature greater than 500 degrees Celsius was set at one-tenth percent. Each control scheme was repeated for 1,000 observations (or intervals of time). The Prior Art scheme falsely detected an unacceptable condition a total of 93 times, as compared to 2 or 3 times for the Embodiment 200. The false detections translate to a reduction in production and sales during 9.3% of the operating time for the Prior Art scheme, as compared to two-tenths of a percent for the Embodiment 200.

Additional advantages may be realized from one or more embodiments of the present invention. The mean or average of the lognormal distribution is a measure of the heat transfer coefficient in the reactor and may be useful in comparing heat removal performance between reactors, thereby identifying the causes of poor reactor heat transfer. The standard deviation of the lognormal distribution is a measure of tube to tube variability in a given reactor and may be useful in identifying differences between reactors with respect to tube to tube variation in reactant stream composition and flow rate. For example, one maleic reactor having an increased ratio of thermocouples required a reduction in reactant stream flow rate. The initial diagnosis of the reactor was a problem with the reactor. However, upon implementing an embodiment of the present invention, the problem was identified as an increase in false alarms due to the Prior Art scheme used with the increased ratio of thermocouples and not the reactor itself.

While the foregoing is directed to embodiments of the present invention, other and further embodiments of the invention may be devised without departing from the basic scope thereof, and the scope thereof is determined by the claims that follow.

What is claimed is:

1. A method of controlling a temperature of a chemical reaction, comprising:
   injecting a reactant stream into a reactor and through a catalyst bed of the reactor, the reactant stream comprising a hydrocarbon and oxygen, thereby causing an exothermic chemical reaction;
   circulating a coolant through the reactor, thereby removing heat from the catalyst bed;
   measuring temperature at a plurality of locations in the catalyst bed;
   calculating a fraction of the catalyst bed greater than a predetermined maximum temperature limit using a probability distribution generated using the temperature measurements, wherein calculating the fraction comprises:
      subtracting a temperature of the catalyst bed adjacent an inlet of the reactor or a control temperature of the coolant from each of the temperature measurements, thereby obtaining temperature differences,
      subtracting a temperature of the catalyst bed adjacent an inlet of the reactor or a temperature of the coolant from the maximum temperature limit, thereby obtaining a maximum temperature limit difference,
      calculating a logarithm of each temperature difference, thereby obtaining log temperature differences, and
      the probability distribution is generated using the log temperature differences; and
   comparing the calculated fraction to a predetermined maximum fraction; and reducing the reactant stream if the calculated fraction exceeds the maximum fraction or increasing the reactant stream if the calculated fraction is less than the maximum fraction.

2. The method of claim 1, wherein:
   calculating the fraction further comprises calculating an average and a standard deviation of the log temperature differences, and
   the probability distribution is generated using the average and the standard deviation of the log temperature differences.

3. The method of claim 2, wherein calculating the fraction further comprises calculating an integral of the lognormal probability distribution from the maximum temperature limit difference to infinity.

4. The method of claim 1, wherein the maximum fraction is less than or equal to four percent.

5. The method of claim 1, wherein the maximum temperature limit is from about 300 degrees Celsius to about 550 degrees Celsius.

6. The method of claim 1, further comprising repeating the fraction calculation every five seconds or less.

7. The method of claim 1, wherein:
   the hydrocarbon has least four carbon atoms in a straight chain,
   the oxygen is provided by air, and
   the reaction produces maleic anhydride.

8. The method of claim 1, wherein the coolant is molten salt.

* * * * *